(12) United States Patent
Hatano et al.

(10) Patent No.: US 12,041,576 B2
(45) Date of Patent: Jul. 16, 2024

(54) DATA COLLECTION DEVICE, SIGNAL GENERATION POSITION IDENTIFICATION SYSTEM, DATA COLLECTION METHOD, SIGNAL GENERATION POSITION IDENTIFICATION METHOD, AND PROGRAM

(71) Applicants: OTSL Inc., Nagoya (JP); FUJI TECOM Inc., Tokyo (JP)

(72) Inventors: Shoji Hatano, Nagoya (JP); Masaru Kobayashi, Nagoya (JP); Koichi Ohta, Niiza (JP)

(73) Assignee: FUJI TECOM INC., Tokyo (JP)

( * ) Notice: Subject to any disclaimer, the term of this patent is extended or adjusted under 35 U.S.C. 154(b) by 312 days.

(21) Appl. No.: 17/609,501

(22) PCT Filed: Apr. 23, 2020

(86) PCT No.: PCT/JP2020/017546
§ 371 (c)(1),
(2) Date: Nov. 8, 2021

(87) PCT Pub. No.: WO2020/226069
PCT Pub. Date: Nov. 12, 2020

(65) Prior Publication Data
US 2022/0232511 A1     Jul. 21, 2022

(30) Foreign Application Priority Data
May 9, 2019   (JP) .................. 2019-089162

(51) Int. Cl.
*H04W 64/00*      (2009.01)
*G01S 5/22*       (2006.01)
(52) U.S. Cl.
CPC ............. *H04W 64/003* (2013.01); *G01S 5/22* (2013.01)

(58) Field of Classification Search
CPC ......... H04W 64/003; G01S 5/22; G08C 15/00
(Continued)

(56) References Cited

U.S. PATENT DOCUMENTS 11,774,464 B2 * 10/2023 Tomago ................... G01P 3/68
                                                        702/149
2003/0158682 A1    8/2003 Tanizume
(Continued)

FOREIGN PATENT DOCUMENTS

CN       1790049 A    6/2006
CN       1904642 A    1/2007
(Continued)

OTHER PUBLICATIONS

Machine English translation of JP 2015-153229 A. Year 2015. pp. 1-11.*
(Continued)

*Primary Examiner* — Don N Vo
(74) *Attorney, Agent, or Firm* — Dority & Manning, P.A.

(57) ABSTRACT

A data collection device includes a reference signal reception unit that receives a reference signal indicating a first time that is a time measured by an external device, the reference signal being transmitted at first time intervals from the external device, a time signal generation unit that measures a time at second time intervals and generates a time signal indicating a second time that is the measured time, a parameter generation unit that generates a parameter value on the basis of the first time indicated by the reference signal and the second time based on the time signal generated at a point in time when the reference signal is received, a signal reception unit that receives an analog signal indicating a signal waveform of an observed signal, a sampling unit that samples the received analog signal at the second time intervals to generate sampling data, and a data processing
(Continued)

unit that performs interpolation processing on the sampling data on the basis of the parameter value.

10 Claims, 9 Drawing Sheets

(58) Field of Classification Search
USPC .................................................... 455/456.1
See application file for complete search history.

(56) References Cited

U.S. PATENT DOCUMENTS

| | | |
|---|---|---|
| 2010/0103878 A1 | 4/2010 | Fujiwara et al. |
| 2013/0144562 A1* | 6/2013 | Ohmae .................. G06F 17/00 702/189 |
| 2013/0271656 A1* | 10/2013 | Iwaki ...................... H04N 5/04 348/515 |
| 2015/0316593 A1 | 11/2015 | Oda |
| 2018/0348810 A1 | 12/2018 | Giesselmann |

FOREIGN PATENT DOCUMENTS

| | | |
|---|---|---|
| CN | 102033487 A | 4/2011 |
| JP | 2008-209995 | 9/2008 |
| JP | 2012029255 A | 2/2012 |
| JP | 2015-153229 | 8/2015 |
| JP | 5846015 | 1/2016 |
| JP | 2017-33069 | 2/2017 |

OTHER PUBLICATIONS

Machine English translation of JP 2017-33069 A. Year 2017. pp. 1-12.*
PCT International Search Report (w/ English translation) for corresponding PCT Application No. PCT/JP2020/017546, mailed on Jun. 16, 2020, 6 pages.
Office Action (with English translation) received in corresponding Application No. CN 2020800344900, dated Dec. 16, 2023, 10 pages.

* cited by examiner

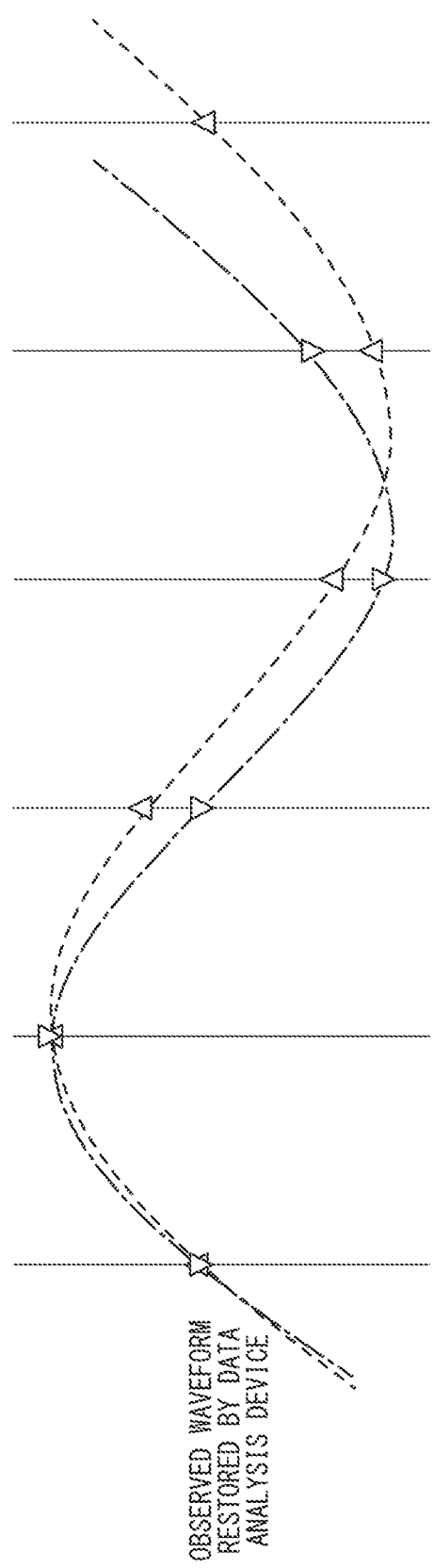

DATA COLLECTION DEVICE, SIGNAL GENERATION POSITION IDENTIFICATION SYSTEM, DATA COLLECTION METHOD, SIGNAL GENERATION POSITION IDENTIFICATION METHOD, AND PROGRAM

TECHNICAL FIELD

The present invention relates to a data collection device, a signal generation position identification system, a data collection method, a signal generation position identification method, and a program.

The present application is a national phase entry of International Patent Application No. PCT/JP2020/017546 filed on Apr. 23, 2020, which is based upon and claims the right of priority to Japanese Patent Application No. 2019-89162, filed May 9, 2019, the content of which are incorporated herein by reference in their entirety for all purposes.

BACKGROUND ART

As one method for identifying a source from which elastic waves such as sound waves are generated, there is a method of analyzing a deviation between signal waveforms of the elastic waves observed by observation devices installed at a plurality of points using a data analysis device (for example, Patent Document 1). In the related art, the signal waveform of the elastic waves obtained by each observation device is transmitted as an analog signal to the data analysis device through wired communication or wireless communication. The data analysis device performs sampling on each of the plurality of collected analog signals, analyzes the deviation between the signal waveforms of the elastic waves, and identifies the source from which the elastic waves are generated.

In a case in which information indicating a signal waveform is transmitted by wired communication, particularly when a target range in which a generation source is identified is large, more communication lines and the like need to be installed, which increases the installation cost. Therefore, in such a case, it is not realistic to transmit information through wired communication. On the other hand, when information indicating a signal waveform is transmitted wirelessly, it is preferable for the transmitted information to be digitized data from the viewpoint of effective utilization of radio waves. Further, when an analog signal is transmitted, unintended noise may be incorporated on a transmission path. From these facts, a method in which each observation device performs sampling on an analog signal indicating a signal waveform and transmits sampling data, which is digitized data, to a data analysis device is conceivable.

PRIOR ART DOCUMENTS

Patent Document

[Patent Document 1] Japanese Patent No. 5846015

SUMMARY OF INVENTION

Problems to be Solved by the Invention

However, when a plurality of independent observation devices perform sampling, a sampling time for each device is likely to differ depending on a deviation between oscillators mounted in the respective observation devices (sampling based on a device-specific time). In such a case, when a data observation device restores the signal waveform by using each piece of collected sampling data as it is, there is a problem in that the accuracy of analysis of the signal waveform is degraded.

The present invention has been made in view of the above technical background, and an object of the present invention is to provide a technology capable of improving the analysis accuracy of a signal waveform.

Means for Solving the Problems

One aspect of the present invention is a data collection device including: a reference signal reception unit configured to receive a reference signal indicating a first time, the first time being a time measured by an external device, and the reference signal being transmitted at first time intervals from the external device; a time signal generation unit configured to measure a time at second time intervals and generate a time signal indicating a second time, the second time being the measured time; a parameter generation unit configured to generate a parameter value on the basis of the first time indicated by the reference signal received by the reference signal reception unit and the second time based on the time signal generated by the time signal generation unit at a point in time when the reference signal reception unit receives the reference signal; a signal reception unit configured to receive an analog signal indicating a signal waveform of an observed signal; a sampling unit configured to sample the analog signal received by the signal reception unit at the second time intervals to generate sampling data; and a data processing unit configured to perform interpolation processing on the sampling data generated by the sampling unit on the basis of the parameter value generated by the parameter generation unit.

Further, another aspect of the present invention is the data collection device, wherein the data processing unit performs linear interpolation processing on the sampling data.

Further, another aspect of the present invention is the data collection device, wherein the parameter generation unit generates a parameter value based on a deviation between the first time and the second time.

Further, another aspect of the present invention is a signal generation position identification system including a plurality of data collection devices and a data analysis device, wherein the data collection device includes a reference signal reception unit configured to receive a reference signal indicating a first time, the first time being a time measured by the data analysis device and the reference signal being transmitted at first time intervals from the data analysis device; a time signal generation unit configured to measure a time at second time intervals and generate a time signal indicating a second time, the second time being the measured time; a parameter generation unit configured to generate a parameter value on the basis of the first time indicated by the reference signal received by the reference signal reception unit and the second time based on the time signal generated by the time signal generation unit at a point in time when the reference signal reception unit receives the reference signal; a signal reception unit configured to receive an analog signal indicating a signal waveform of an observed signal; a sampling unit configured to sample the analog signal received by the signal reception unit at the second time intervals to generate sampling data; a data processing unit configured to perform interpolation processing on the sampling data generated by the sampling unit on the basis of the parameter value generated by the parameter generation unit to generate interpolated data; and a data transmission unit configured to transmit the interpolated data generated by the data processing unit to the data analysis device, and the data analysis device includes a reference signal generation unit configured to generate the reference signal at the first time intervals; a reference signal transmission unit configured to transmit the reference signal generated by the reference signal generation unit to the data collection device; a data reception unit configured to receive the interpolated data transmitted from each of the plurality of data collection devices; and a data analysis unit configured to identify a position in which the signal is generated by analyzing a plurality of pieces of the interpolated data received by the data reception unit.

Further, another aspect of the present invention is the signal generation position identification system, wherein the data analysis unit restores the signal waveform from each of the plurality of pieces of interpolated data and identifies the generation position on the basis of the deviation between the restored signal waveforms.

Further, another aspect of the present invention is a data collection method including: a reference signal reception step for receiving a reference signal indicating a first time, the first time being a time measured by an external device, and the reference signal being transmitted at first time intervals from the external device; a time signal generation step for measuring a time at second time intervals and generating a time signal indicating a second time, the second time being the measured time; a parameter generation step for generating a parameter value on the basis of the first time indicated by the reference signal received in the reference signal reception step and the second time based on the time signal generated in the time signal generation step at a point in time when the reference signal is received in the reference signal reception step; a signal reception step for receiving an analog signal indicating a signal waveform of an observed signal; a sampling step for sampling the analog signal received in the signal reception step at the second time intervals to generate sampling data; and a data processing step for performing interpolation processing on the sampling data generated in the sampling step on the basis of the parameter value generated in the parameter generation step.

Further, another aspect of the present invention is a signal generation position identification method in a signal generation position identification system including a plurality of data collection devices and a data analysis device, the signal generation position identification method comprising: a reference signal generation step for generating a reference signal indicating a first time at first time intervals, the first time being a time measured by the data analysis device; a reference signal transmission step for transmitting the reference signal generated in the reference signal generation step to the data collection device; a reference signal reception step for receiving the reference signal from the data analysis device; a time signal generation step for measuring a time at second time intervals and generating a time signal indicating a second time, the second time being the measured time; a parameter generation step for generating a parameter value on the basis of the first time indicated by the reference signal received in the reference signal reception step and the second time based on the time signal generated in the time signal generation step at a point in time when the reference signal is received in the reference signal reception step; a signal reception step for receiving an analog signal indicating a signal waveform of an observed signal; a sampling step for sampling the analog signal received in the signal reception step at the second time intervals to generate sampling data; a data processing step for performing interpolation processing on the sampling data generated in the sampling step on the basis of the parameter value generated in the parameter generation step to generate interpolated data; a data transmission step for transmitting the interpolated data generated in the data processing step to the data analysis device; a data reception step for receiving the interpolated data transmitted from each of the plurality of data collection devices; and a data analysis step for identifying a position in which the signal is generated by analyzing a plurality of pieces of the interpolated data received in the data reception step.

Further, another aspect of the present invention is a program for causing a computer to function as the data collection device.

Advantageous Effects of the Invention

According to the present invention, it is possible to improve the accuracy of analysis of a signal waveform.

BRIEF DESCRIPTION OF DRAWINGS

FIG. 2B is a schematic diagram illustrating a deviation between signal waveforms due to the deviation between the period of the reference signal and the period of the time signal.

EMBODIMENTS FOR CARRYING OUT THE INVENTION

Hereinafter, an embodiment of the present invention will be described with reference to the drawings.
[Overall Configuration of Signal Generation Position Identification System]

Hereinafter, an overall configuration of the signal generation position identification system 1 will be described.

Figure 1:
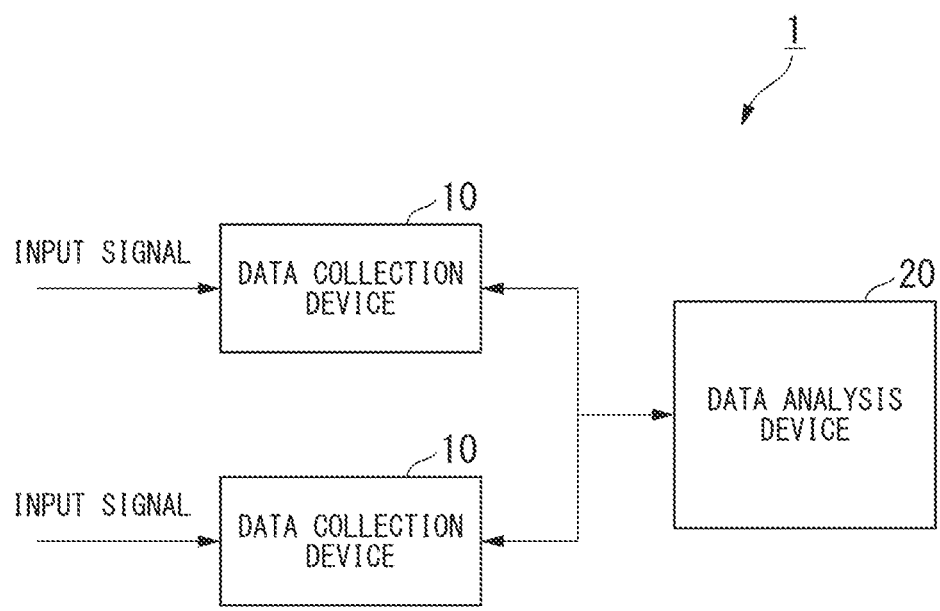
FIG. 1 is a block diagram illustrating an overall configuration of a signal generation position identification system 1 according to an embodiment of the present invention.

FIG. 1 is a block diagram illustrating an overall configuration of a signal generation position identification system 1 according to an embodiment of the present invention. As illustrated in FIG. 1, the signal generation position identification system 1 includes a plurality of data collection devices 10 and a data analysis device 20.

The signal generation position identification system 1 is a system for identifying a generation position of elastic waves such as sound waves observed at at least two observation points by analyzing the elastic waves. The signal generation position identification system 1 can be used, for example, in a case in which a generation position of a water leak, a gas leak, or the like is identified by acquiring sound waves from sound sensors installed at a plurality of places along a pipe for water or gas. In order to efficiently identify the generation position, it is preferable for sensors such as such a sound sensor to be disposed along the pipe, for example, fastened in a net shape.

The data collection device 10 is an information processing device such as a leak detector. The plurality of data collection devices 10 are installed, for example, near sensors (not illustrated) installed at a plurality of places. The data collection device 10 acquires input signals from the nearby sensors. The input signal is an analog signal indicating a signal waveform of the elastic wave measured by a nearby sensor. Although only two data collection devices 10 are illustrated in FIG. 1, three or more data collection devices 10 may be used. The data collection device 10 itself may be configured to include a sensor.

Further, the data collection device 10 measures a current time at predetermined time intervals and generates a time signal. The time signal is a signal indicating the current time measured by the data collection device 10. The data collection device 10 generates digitized sampling data by sampling the acquired analog signal at a timing when the time signal is generated.

Further, the data collection device 10 receives a reference signal output from the data analysis device 20 at predetermined time intervals. The reference signal is a signal indicating the current time measured by the data analysis device 20. The data collection device 10 generates a parameter value on the basis of a deviation between the time indicated by the received reference signal and a time indicated by the time signal generated at a point in time at which the reference signal has been received.

The data collection device 10 performs interpolation processing (for example, linear interpolation processing) on the generated sampling data on the basis of the above parameter value. Accordingly, the data collection device 10 generates the sampling data subjected to interpolation processing (hereinafter referred to as "interpolated data"). The data collection device 10 transmits the generated interpolated data to the data analysis device 20.

The data collection device 10 and the data analysis device 20 communicate with each other via specific low power radio bands such as those of 429 MHz (megahertz) or 920 MHz, or wireless communication such as short-range wireless communication.

The data analysis device 20 is an information processing device such as a microcomputer, an industrial computer, a personal computer, or a tablet terminal. The data analysis device 20 generates the reference signal described above at predetermined time intervals. The data analysis device 20 transmits the generated reference signal to the data collection device 10.

Further, the data analysis device 20 receives the interpolated data transmitted from each data collection device 10. The data analysis device 20 restores each signal waveform on the basis of the received interpolated data. The data analysis device 20 performs analysis on the basis of a deviation between the plurality of restored signal waveforms and identifies a position in which the elastic waves are generated. Information indicating an identification result may be output as data to an external device or may be output to a display unit (not illustrated) such as a liquid crystal display included in the data analysis device 20.

Hereinafter, the interpolation processing performed by the data collection device 10 will be described with reference to the drawings.

Figure 2A:
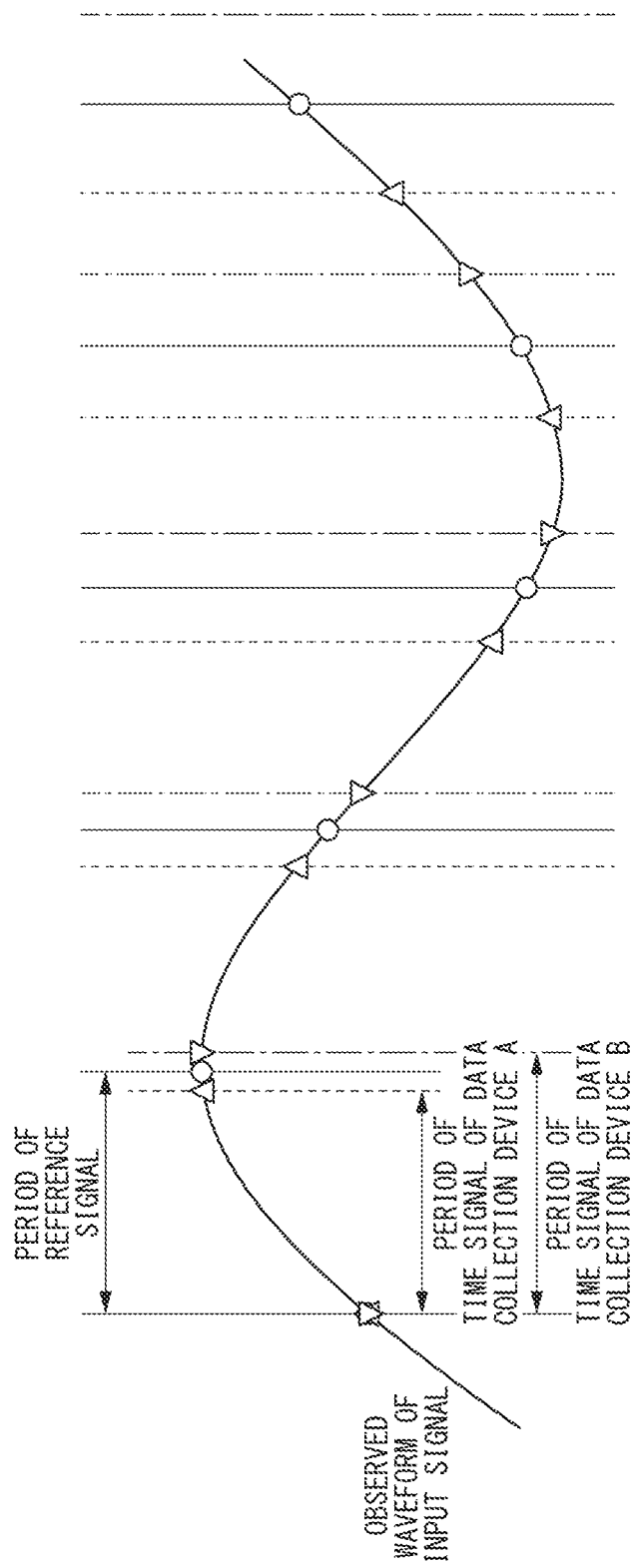
FIG. 2A is a schematic diagram illustrating a deviation between signal waveforms due to a deviation between a period of a reference signal and a period of a time signal.

FIGS. 2A and 2B are schematic views illustrating a deviation between signal waveforms due to a deviation between the period of the reference signal and the period of the time signal. In FIG. 2A, a vertical sold line indicates the period of the reference signal output from the data analysis device 20. Further, a vertical broken line indicates the period of the time signal generated by one data collection device of the related art (hereinafter referred to as "data collection device A"). Further, a vertical alternate long and short dash line indicates the period of the time signal generated by another data collection device of the related art (hereinafter referred to as "data collection device B").

In the example illustrated in FIG. 2A, a period of a time signal of the data collection device A is shorter than the period of the reference signal, and a period of a time signal of the data collection device B is longer than the period of the reference signal. That is, a clock included in the data collection device A is faster than a clock included in the data analysis device 20, and a clock included in the data collection device B is slower than the clock included in the data analysis device 20. Thus, there is a deviation between the time based on the reference signal, a time based on a time signal of the data collection device A, and a time based on the time signal of the data collection device B. An example of a signal waveform in a case in which restoration from the sampling data is performed by the data analysis device 20 without such a deviation being corrected is illustrated in FIG. 2B.

As illustrated in FIG. 2B, when the sampling data sampled according to the time signal of the data collection device A and the time signal of the data collection device B is restored to a signal waveform on the basis of a clock of the data analysis device 20 (that is, on the basis of the period of the reference signal), the sampling data is restored to a waveform different from a waveform of an actual input signal illustrated in FIG. 2A. In FIG. 2B, a signal waveform indicated by a broken line indicates a signal waveform restored on the basis of the sampling data acquired from the data collection device A. On the other hand, a signal waveform indicated by an alternate long and short dash line indicates a signal waveform restored on the basis of the sampling data acquired from the data collection device B.

For example, in the case of sound waves, a sound restored on the basis of the sampling data acquired from the data collection device A is lower-pitched than the sound actually generated at a sound generation location. Further, a sound restored on the basis of the sampling data acquired from the data collection device A is higher-pitched than the sound actually generated at the sound generation location. Thus, even when the same sound is observed, a deviation occurs in the restored sound.

On the other hand, the data collection device 10 according to the present embodiment performs interpolation processing so as to eliminate deviation between the restored signal waveforms.

Figure 3:
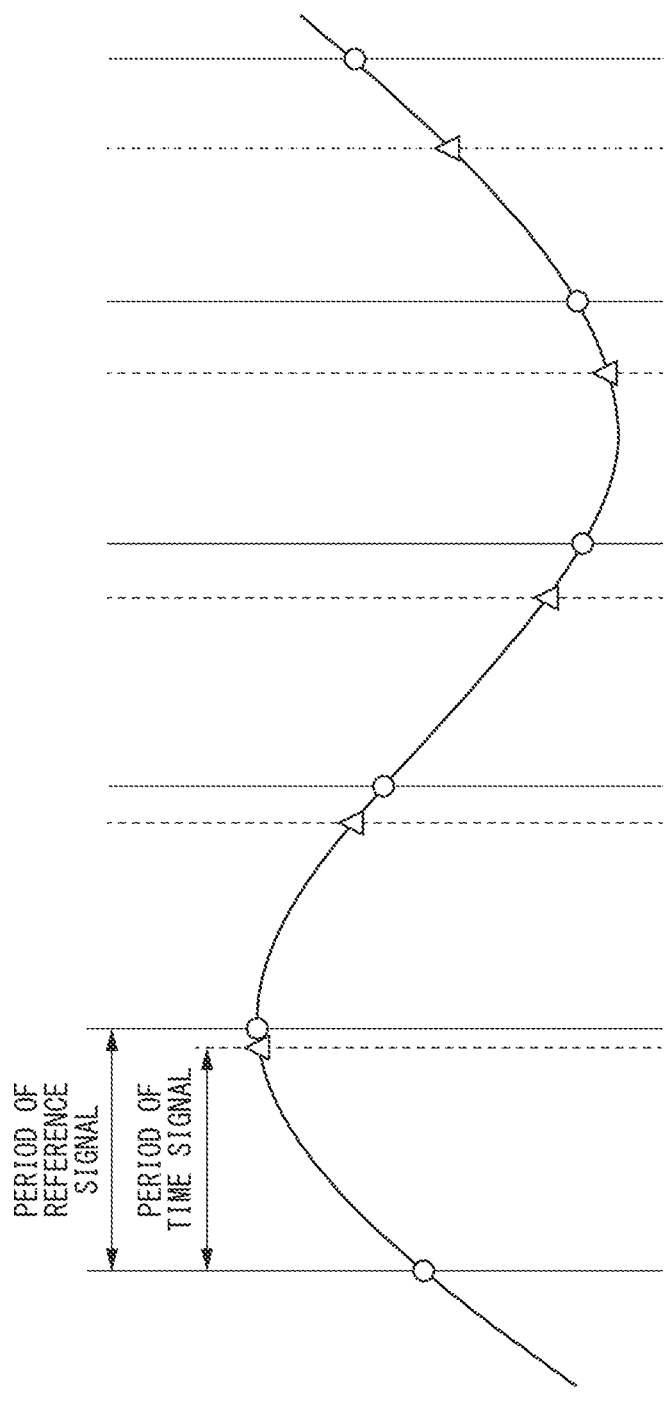
FIG. 3 is a schematic diagram illustrating linear interpolation processing in the data collection device 10 according to the embodiment of the present invention.

FIG. 3 is a schematic diagram illustrating linear interpolation processing in the data collection device 10 according to an embodiment of the present invention. In FIG. 3, it is assumed that a vertical sold line indicates the period of the reference signal output from the data analysis device 20. Further, a vertical broken line indicates the period of the time signal generated by one data collection device 10. In the example illustrated in FIG. 3, the period of the time signal of the data collection device 10 is shorter than the period of the reference signal. A signal waveform illustrated in FIG. 3 is a waveform restored by sampling data corresponding to the period of the time signal.

The data collection device 10 detects a deviation between a clock included in the data analysis device 20 and a clock included in the data collection device 10 using a deviation between the time based on the reference signal and the time based on the time signal generated by the data collection device 10. As illustrated in FIG. 3, the data collection device 10 generates a value of sampling data corresponding to the period of the reference signal through interpolation processing such as linear interpolation processing on the basis of the detected deviation between the clocks.

The data collection device 10 transmits the interpolated data to the data analysis device 20. Accordingly, the data analysis device 20 can acquire sampling data unified in the period of the reference signal from each data collection device 10. Accordingly, the data analysis device 20 can analyze a deviation between the signal waveforms on the basis of the sampling data in which the deviation between the clocks has been corrected and thus, it is possible to identify the position in which the elastic waves are generated, more accurately.

[Configuration of Data Collection Device]

Hereinafter, a functional configuration of the data collection device 10 will be described in greater detail.

Figure 4:
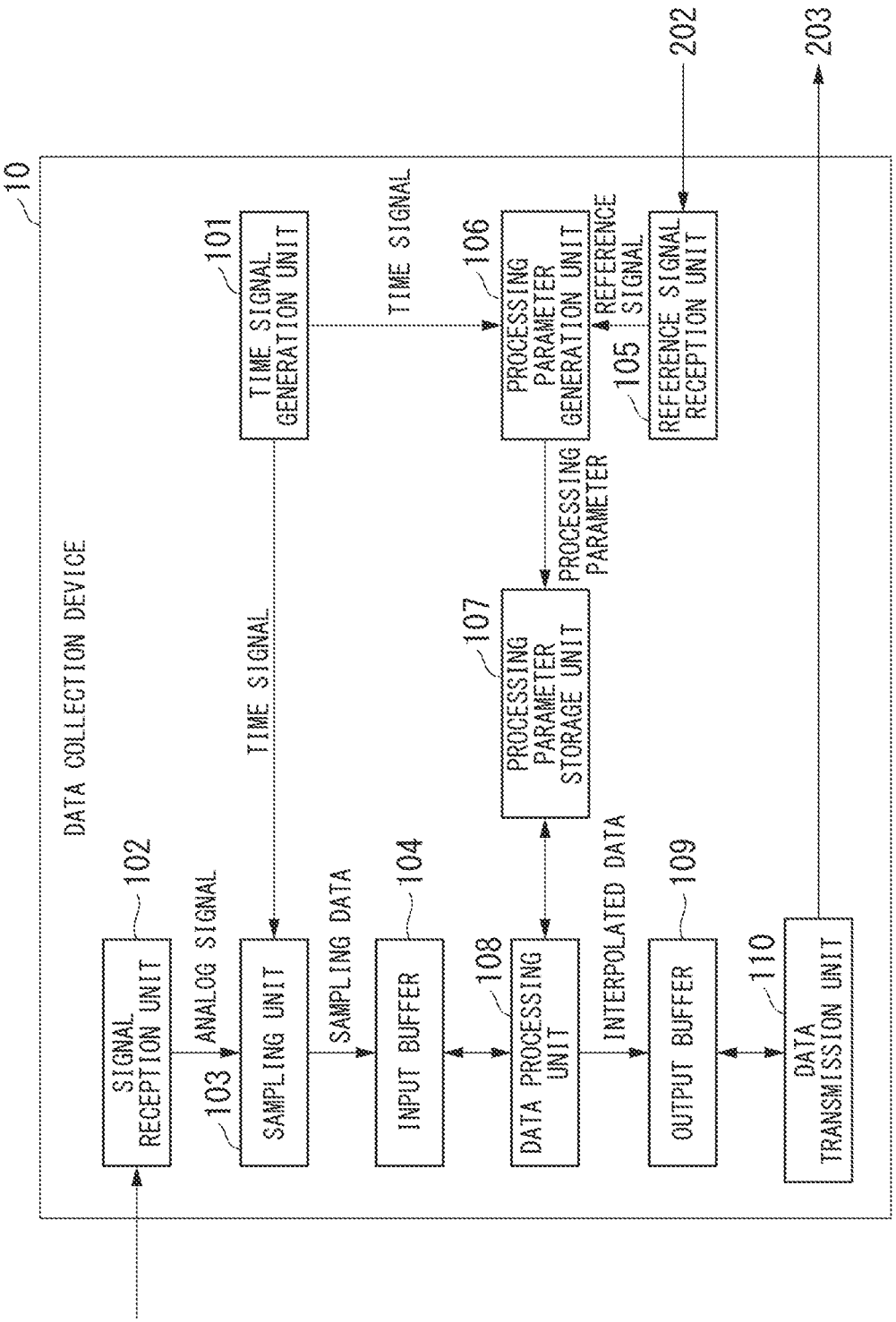
FIG. 4 is a block diagram illustrating a functional configuration of the data collection device 10 according to the embodiment of the present invention.

FIG. 4 is a block diagram illustrating a functional configuration of the data collection device 10 according to the embodiment of the present invention. As illustrated in FIG. 4, the data collection device 10 includes a time signal generation unit 101, a signal reception unit 102, a sampling unit 103, an input buffer 104, a reference signal reception unit 105, a processing parameter generation unit 106, a processing parameter storage unit 107, a data processing unit 108, an output buffer 109, and a data transmission unit 110.

The time signal generation unit 101 measures a time (a second time). The time signal generation unit 101 includes, for example, an oscillator (not illustrated) such as a ceramic oscillator or a crystal oscillator, and generates a time signal indicating the measured time at predetermined time intervals (second time intervals), and outputs the generated time signal to the sampling unit 103 and the processing parameter generation unit 106. The predetermined time interval is, for example, 1 μs (microseconds).

The time measured by the time signal generation unit 101 is, for example, a time indicating an elapsed time from a predetermined point in time. The predetermined point in time is, for example, a point in time when the time signal generation unit 101 has acquired a command output from the data analysis device 20 for instructing the data collection device 10 to start sampling. Here, the time measured by the time signal generation unit 101 is not limited to such a time indicating the elapsed time from the predetermined point in time, and may be, for example, a current time.

The signal reception unit 102 is a communication interface for communicatively connecting with an external device (for example, a sensor such as a sound sensor) that detects generated elastic waves. The signal reception unit 102 is communicatively connected to the external device via a wireless or wired communication path. The signal reception unit 102 receives an analog signal indicating the signal waveform of the elastic waves, which is constantly output from the external device. The signal reception unit 102 constantly outputs the analog signal that is constantly received, to the sampling unit 103.

The sampling unit 103 acquires an analog signal that is constantly output from the signal reception unit 102. Further, the sampling unit 103 acquires the time signal output at the predetermined time intervals (the second time intervals) from the time signal generation unit 101. The sampling unit 103 generates sampling data by performing sampling on the analog signal at each point in time when the time signal is acquired (that is, at predetermined time intervals). The sampling unit 103 stores the generated sampling data in the input buffer 104. The sampling data is, for example, data in which a time at predetermined time intervals and a value obtained by quantizing the level of the signal waveform are associated with each other.

The input buffer 104 stores the sampling data generated by the sampling unit 103. The sampling data stored in the input buffer 104 may be deleted, for example, at a point in time when the data processing unit 108 reads the data. The input buffer 104 is configured using, for example, storage media such as a random access read/write memory (RAM), a flash memory, an electrically erasable programmable read only memory (EEPROM), and a hard disk drive (HDD), or any combination of these storage media.

The reference signal reception unit 105 is a communication interface for communicative connection to the data analysis device 20. The reference signal reception unit 105 communicatively connects to the data analysis device 20 via a wireless communication path based on specific low power radio, short-range wireless communication, or the like, for example. The reference signal reception unit 105 receives the reference signal transmitted at predetermined time intervals (first time intervals) from the data analysis device 20. The reference signal referred to here is a signal indicating a time (a first time) measured at the predetermined time intervals (first time intervals) by the data analysis device 20. The predetermined time interval is, for example, 1 s (second). The reference signal reception unit 105 outputs the received reference signal to the processing parameter generation unit 106.

The time measured by the data analysis device 20 is, for example, a time indicating an elapsed time from a predetermined point in time. The predetermined point in time is, for example, a point in time when the data analysis device 20 transmits the command for instructing the data collection device 10 to start sampling to the data collection device 10. Here, the time measured by the time signal generation unit 101 is not limited to such a time indicating the elapsed time from the predetermined point in time, and may be, for example, the current time.

The processing parameter generation unit 106 (parameter generation unit) acquires the reference signal output from the reference signal reception unit 105, at predetermined time intervals (for example, 1 s). Further, the processing parameter generation unit 106 acquires the time signal output from the time signal generation unit 101 at predetermined time intervals (for example, 1 μs). The processing parameter generation unit 106 generates a parameter value on the basis of a time indicated by the acquired reference signal (the first time) and a time indicated by the time signal acquired at a point in time when the reference signal is acquired (a second time). The processing parameter generation unit 106 stores the generated parameter value in the processing parameter storage unit 107.

The parameter value referred to here is, for example, a value (unit: ppm (Parts Per Million)) indicating a deviation between the time indicated by the reference signal acquired by the processing parameter generation unit 106 and the time indicated by the time signal acquired at a point in time when the reference signal is acquired. The processing parameter generation unit 106 may be configured to acquire the time signal by requesting the time signal generation unit 101 to output the time signal at a point in time when the reference signal has been acquired. The processing parameter generation unit 106 may generate the parameter value after performing correction processing for considering, for example, a propagation time required for propagation of the reference signal from the data analysis device 20 to the data collection device 10.

The processing parameter storage unit 107 stores the parameter value generated by the processing parameter generation unit 106. The parameter value stored in the processing parameter storage unit 107 may be deleted, for example, at a point in time when reading is performed by the data processing unit 108. The processing parameter storage unit 107 is configured using, for example, storage mediums such as a RAM, a flash memory, an EEPROM, and an HDD, or any combination of these storage media.

The data processing unit 108 acquires the sampling data stored in the input buffer 104. The data processing unit 108 acquires the sampling data, for example, at a point in time when an amount of sampling data stored in the input buffer 104 reaches a predetermined amount of data. The data processing unit 108 may be configured to acquire the sampling data at predetermined time intervals.

Further, the data processing unit 108 acquires the parameter value stored in the processing parameter storage unit 107. The data processing unit 108 acquires the parameter value, for example, at a point in time when the sampling data stored in the input buffer 104 is acquired. The data processing unit 108 generates the interpolated data by performing interpolation processing on the acquired sampling data on the basis of the acquired parameter value. The data processing unit 108 stores the generated interpolated data in the output buffer 109.

The interpolated data is, for example, data in which the time based on the reference signal and a value indicating a level of the signal waveform calculated by the interpolation processing are associated with each other. The data processing unit 108 calculates a value indicating the level of the signal waveform corresponding to the time based on the reference signal from, for example, a deviation between the sampling data and the parameter value through, for example, interpolation processing using linear interpolation. In the sampling data, the time based on the time signal and the value indicating the level of the signal waveform are associated with each other. The interpolation processing used here is not limited to the interpolation processing based on linear interpolation, and for example, interpolation processing based on polynomial interpolation, interpolation processing based on a sampling theorem, or the like may be used.

The output buffer 109 stores the interpolated data generated by the data processing unit 108. The interpolated data stored in the output buffer 109 may be deleted, for example, at a point in time when reading is performed by the data transmission unit 110. The output buffer 109 is configured using, for example, storage mediums such as a RAM, a flash memory, an EEPROM, and an HDD, or any combination of these storage media.

The data transmission unit 110 is a communication interface for communicative connection to the data analysis device 20. The data transmission unit 110 communicatively connects to the data analysis device 20 via a wireless communication path based on a specific low power radio, short-range wireless communication, or the like, for example. The data transmission unit 110 acquires the interpolated data stored in the output buffer 109. The data transmission unit 110 acquires the interpolated data, for example, at a point in time when the amount of the interpolated data stored in the output buffer 109 reaches the predetermined data amount. The data transmission unit 110 may be configured to acquire the interpolated data at predetermined time intervals. The data transmission unit 110 transmits the acquired interpolated data to the data analysis device 20.

The data transmission unit 110 may have a configuration in which a point in time (transmission frame) when data is transmitted to the data analysis device 20 is determined in advance. For example, the data transmission unit 110 may be configured so that there is a timing when the data collection device 10 can transmit data at predetermined time intervals (for example, 1 s). In this case, the data collection device 10 may acquire and transmit the interpolated data, for example, at a point in time when the amount of the interpolated data stored in the output buffer 109 reaches a predetermined amount of data and the data can be transmitted.

[Configuration of Data Analysis Device]

Hereinafter, a functional configuration of the data analysis device 20 will be described in greater detail.

Figure 5:
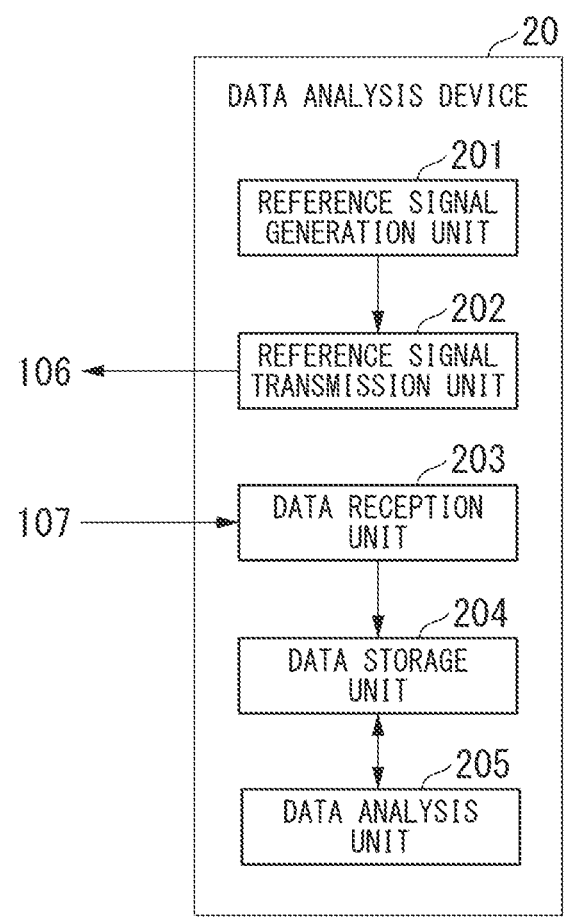
FIG. 5 is a block diagram illustrating a functional configuration of a data analysis device 20 according to the embodiment of the present invention.

FIG. 5 is a block diagram illustrating a functional configuration of the data analysis device 20 according to the embodiment of the present invention. As illustrated in FIG. 5, the data analysis device 20 includes a reference signal generation unit 201, a reference signal transmission unit 202, a data reception unit 203, a data storage unit 204, and a data analysis unit 205.

The reference signal generation unit 201 measures the time (the first time). The reference signal generation unit 201 includes an oscillator (not illustrated) such as a ceramic oscillator or a crystal oscillator, generates a reference signal indicating the measured time at predetermined time intervals (first time intervals), and outputs the generated reference signal to the reference signal transmission unit 202. The predetermined time interval is, for example, 1 s.

The time measured by the reference signal generation unit 201 is, for example, a time indicating an elapsed time from a predetermined point in time. The predetermined point in time is, for example, a point in time when the data analysis device 20 outputs the command for instructing the data collection device 10 to start sampling to the data collection device 10. Here, the time measured by the reference signal generation unit 201 is not limited to such a time indicating the elapsed time from the predetermined point in time and may be, for example, the current time.

The reference signal transmission unit 202 is a communication interface for communicative connection to each of the plurality of data collection devices 10. The reference signal transmission unit 202 communicative connects to each data collection device 10 via a wireless communication path based on a specific low power radio, short-range wireless communication, or the like, for example. The reference signal transmission unit 202 acquires the reference signal generated at the predetermined time intervals by the reference signal generation unit 201. The reference signal transmission unit 202 transmits the acquired reference signal to each data collection device 10 at the predetermined time intervals.

The data reception unit 203 is a communication interface for communicative connection to each of the plurality of data collection devices 10. The data reception unit 203 communicatively connects to each data collection device 10 via a wireless communication path based on a specific low power radio, short-range wireless communication, or the like, for example. The data reception unit 203 receives the interpolated data transmitted from each data collection device 10. The data reception unit 203 stores each piece of received interpolated data in the data storage unit 204.

The data storage unit 204 stores the interpolated data output from the data reception unit 203. The interpolated data stored in the data storage unit 204 may be deleted, for example, at a point in time when reading is performed by the data analysis unit 205. The data storage unit 204 is configured using, for example, storage mediums such as a RAM, a flash memory, an EEPROM, and an HDD, or any combination of these storage media.

The data analysis unit 205 acquires the interpolated data transmitted from each of the plurality of data collection devices 10, which has been stored in the data storage unit 204. A timing when the data analysis unit 205 acquires the interpolated data is arbitrary. The timing may be, for example, a timing when an operator who identifies the position in which elastic waves are generated wants to identify.

The data analysis unit 205 identifies the position in which the elastic waves (signal) are generated by analyzing the plurality of pieces of acquired interpolated data. For example, the data analysis unit 205 restores the signal waveform from each piece of the plurality of pieces of acquired interpolated data. The data analysis unit 205 identifies the position in which the elastic waves are generated on the basis of the deviation between the plurality of restored signal waveforms.

[Operation of Sampling Unit]

Hereinafter, an example of an operation of the sampling unit 103 will be described.

Figure 6:
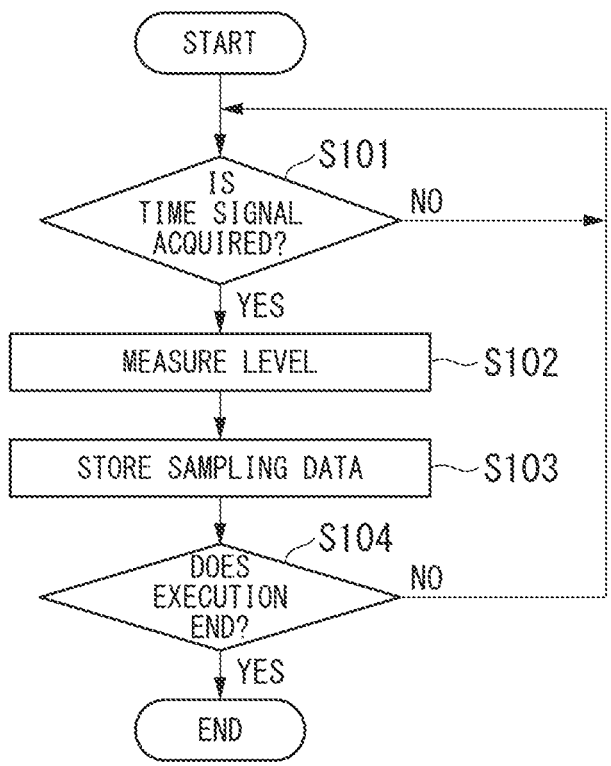
FIG. 6 is a flowchart illustrating an operation of a sampling unit 103 of the data collection device 10 according to the embodiment of the present invention.

FIG. 6 is a flowchart illustrating the operation of the sampling unit 103 of the data collection device 10 according to the embodiment of the present invention. The operation shown in this flowchart is started, for example, at a point in time when the data collection device 10 acquires the command output from the data analysis device 20 for instructing the data collection device 10 to start sampling. Alternatively, an operation shown in this flowchart is started, for example, at a point in time when the acquisition of the analog signal constantly output from the signal reception unit 102 is started.

The sampling unit 103 waits for the acquisition of the time signal output at the predetermined time intervals from the time signal generation unit 101 (step S101). When the time signal is acquired (step S101: Yes), the sampling unit 103 measures the level of the signal waveform based on the analog signal at the point in time when the time signal is acquired (step S102). The sampling unit 103 generates sampling data, in which the time indicated by the acquired time signal and a value indicating the level of the signal waveform are associated with each other, and stores the generated sampling data in the input buffer 104 (step S103).

When the sampling unit 103 continues the above sampling process (step S104: No), the sampling unit 103 continues to wait for the acquisition of the time signal (step S101). When the sampling unit 103 ends the above sampling process (step S104: Yes), the operation of the sampling unit 103 shown in the flowchart of FIG. 6 ends. A case in which the sampling processing ends is, for example, a case in which the data collection device 10 has acquired the command for instructing the data collection device 10 to end the sampling, which is output from the data analysis device 20. Alternatively, a case in which the sampling process ends is, for example, a case in which the analog signal is not output from the signal reception unit 102.

[Operation of Processing Parameter Generation Unit]

Hereinafter, an example of an operation of the processing parameter generation unit 106 will be described.

Figure 7:
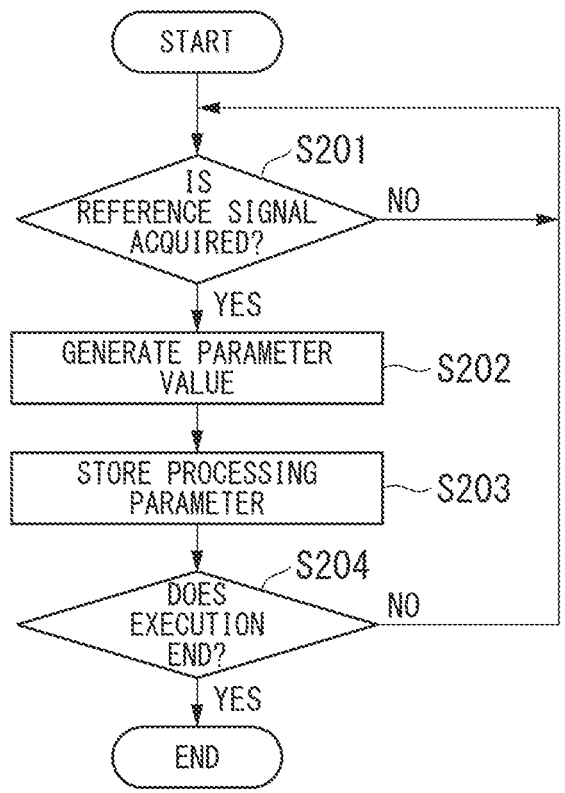
FIG. 7 is a flowchart illustrating an operation of a processing parameter generation unit 106 of the data collection device 10 according to the embodiment of the present invention.

FIG. 7 is a flowchart illustrating the operation of the processing parameter generation unit 106 of the data collection device 10 according to the embodiment of the present invention. The operation shown in this flowchart is started, for example, at a point in time when the data collection device 10 acquires the command output from the data analysis device 20 for instructing the data collection device 10 to start sampling.

The processing parameter generation unit 106 waits for the acquisition of the reference signal output at the predetermined time intervals from the reference signal reception unit 105 (step S201). When the reference signal is acquired (step S201: Yes), the processing parameter generation unit 106 generates the parameter value on the basis of the time indicated by the acquired reference signal and the time indicated by the time signal acquired at a point in time when the reference signal is acquired (step S202). The processing parameter generation unit 106 stores the generated parameter value in the processing parameter storage unit 107 (step S203).

When the processing parameter generation unit 106 continues the processing of generating the above parameter value (step S204: No), the processing parameter generation unit 106 continues to wait for the acquisition of the reference signal (step S101). When the processing parameter generation unit 106 ends the processing of generating the above parameter value (step S204: Yes), the operation of the processing parameter generation unit 106 shown in the flowchart of FIG. 7 ends. A case in which the processing of generating the parameter value ends is, for example, a case in which the data collection device 10 has acquired the command for instructing the data collection device 10 to end the sampling, which is output from the data analysis device 20.

[Operation of Data Processing Unit]

Hereinafter, an example of an operation of the data processing unit 108 will be described.

Figure 8:
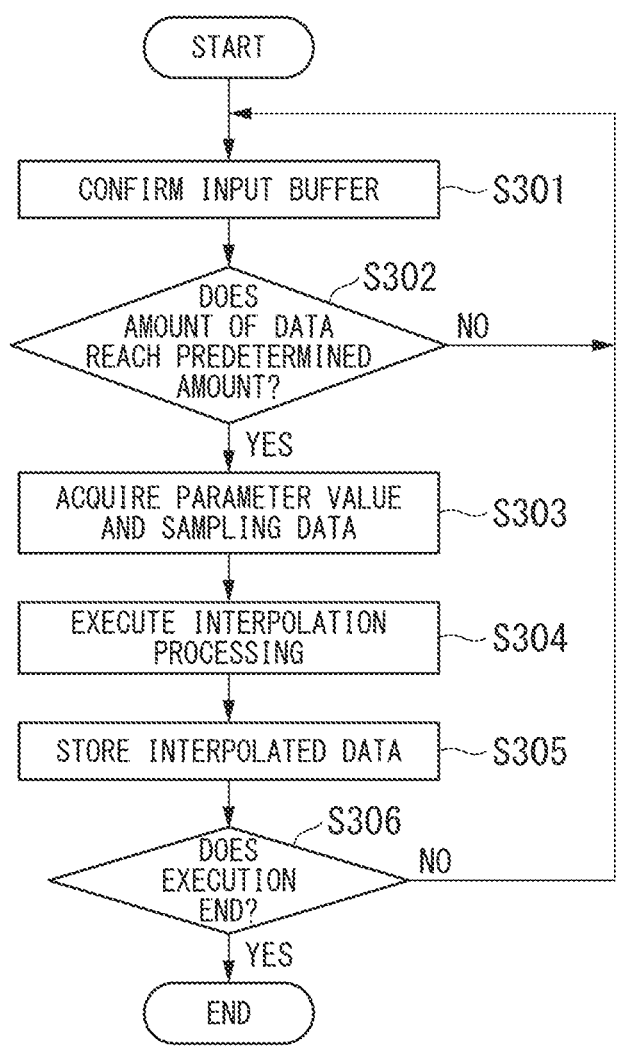
FIG. 8 is a flowchart illustrating an operation of the data processing unit 108 of the data collection device 10 according to the embodiment of the present invention.

FIG. 8 is a flowchart illustrating the operation of the data processing unit 108 of the data collection device 10 according to the embodiment of the present invention. The operation shown in this flowchart is started, for example, at a point in time when the data collection device 10 acquires the command output from the data analysis device 20 for instructing the data collection device 10 to start sampling.

The data processing unit 108 confirms the amount of sampling data stored in the input buffer 104 (step S301). When the amount of sampling data stored in the input buffer 104 does not reach the predetermined data amount (step S302: No), the data processing unit 108 continues to confirm the amount of sampling data (step S301).

When the amount of sampling data stored in the input buffer 104 reaches the predetermined data amount (step S302: Yes), the data processing unit 108 acquires the sampling data stored in the input buffer 104. Further, in this case, the data processing unit 108 acquires the parameter value stored in the processing parameter storage unit 107 (step S303).

The data processing unit 108 executes interpolation processing on the acquired sampling data on the basis of the acquired parameter value (step S304). The data processing unit 108 stores the interpolated data generated by the interpolation processing in the output buffer 109 (step S305).

When the data processing unit 108 continues the execution of the above interpolation processing (step S306: No), the data processing unit 108 continues to confirm the amount of sampling data stored in the input buffer 104 (step S301). When the data processing unit 108 ends the execution of the interpolation processing (step S306: Yes), the operation of the data processing unit 108 shown in the flowchart of FIG. 8 ends. A case in which the execution of the interpolation processing ends is, for example, a case in which the data collection device 10 has acquired the command for instructing the data collection device 10 to end the sampling, which is output from the data analysis device 20.

[Operation of Data Transmission Unit]

Hereinafter, an example of an operation of the data transmission unit 110 will be described.

Figure 9:
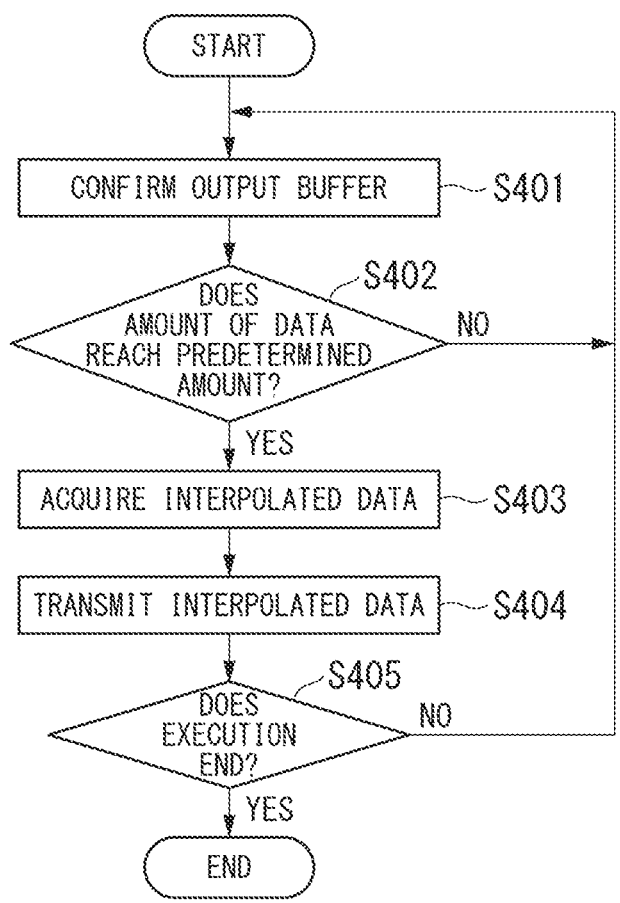
FIG. 9 is a flowchart illustrating an operation of the data transmission unit 110 of the data collection device 10 according to the embodiment of the present invention.

FIG. 9 is a flowchart illustrating the operation of the data transmission unit 110 of the data collection device 10 according to the embodiment of the present invention. The operation shown in this flowchart is started, for example, at a point in time when the data collection device 10 acquires the command output from the data analysis device 20 for instructing the data collection device 10 to start sampling.

The data transmission unit 110 confirms the amount of interpolated data stored in the output buffer 109 (step S401). When the amount of the interpolated data stored in the output buffer 109 does not reach the predetermined data amount (step S402: No), the data transmission unit 110 continues to confirm the amount of the interpolated data (step S401).

When the amount of interpolated data stored in the output buffer 109 reaches the predetermined amount (step S402: Yes), the data transmission unit 110 acquires the interpolated data stored in the output buffer 109 (step S403). The data transmission unit 110 transmits the acquired interpolated data to the data analysis device 20 (step S405).

When the data transmission unit 110 continues the execution of the transmission processing of the interpolated data (step S405: No), the data transmission unit 110 continues to confirm the amount of the interpolated data stored in the output buffer 109 (step S401). Further, when the data transmission unit 110 ends the execution of the transmission processing of the interpolated data (step S405: Yes), the operation of the data transmission unit 110 shown in the flowchart of FIG. 9 ends. A case in which the execution of the transmission processing of the interpolated data ends is, for example, a case in which the data collection device 10 has acquired the command for instructing the data collection device 10 to end the sampling, which is output from the data analysis device 20.

As described above, the data collection device 10 according to the embodiment of the present invention includes the reference signal reception unit 105 configured to receive the reference signal indicating the first time, the first time being a time measured by an external device (the data analysis device 20), and the reference signal being transmitted at the predetermined first time intervals from the external device; the time signal generation unit 101 configured to measure a time at predetermined second time intervals and generate the time signal indicating the second time, the second time being the measured time; the parameter generation unit (the processing parameter generation unit 106) configured to generate a parameter value on the basis of the first time indicated by the reference signal received by the reference signal reception unit 105 and the second time based on the time signal generated by the time signal generation unit 101 at a point in time when the reference signal reception unit 105 receives the reference signal; the signal reception unit 102 configured to receive an analog signal indicating a signal waveform of an observed signal; the sampling unit 103 configured to sample the analog signal received by the signal reception unit 102 at the second time intervals to generate sampling data; and the data processing unit 108 configured to perform interpolation processing on the sampling data generated by the sampling unit 103 on the basis of the parameter value generated by the parameter generation unit (the processing parameter generation unit 106).

By including the above configuration, the data collection device 10 according to the embodiment of the present invention can perform the interpolation processing using the parameter value from the sampling data corresponding to the time signal generated by the own device to generate the value of the sampling data (corrected data) corresponding to the period of the reference signal acquired from the external device (the data analysis device 20). Accordingly, the data collection device 10 can transmit the corrected data unified in the period of the reference signal generated by the external device (the data analysis device 20) to the external device. Accordingly, the data collection device 10 can eliminate the deviation between the signal waveforms restored from the corrected data obtained from the plurality of data collection devices 10 in the external device (the data analysis device 20). Accordingly, the data collection device 10 can improve the accuracy of the analysis of the signal waveform.

Further, as described above, the signal generation position identification system 1 according to the embodiment of the present invention includes the plurality of data collection devices 10 having the above configuration, and the data analysis device 20. The data analysis device 20 includes the reference signal generation unit 201 that generates the reference signal at the first time intervals, the reference signal transmission unit 202 that transmits the reference signal generated by the reference signal generation unit 201 to the data collection device 10, the data reception unit 203 that receives the interpolated data transmitted from each of the plurality of data collection devices 10, and the data analysis unit 205 that identifies a position in which the signal is generated by analyzing a plurality of pieces of the interpolated data received by the data reception unit 203.

By including the above configuration, the signal generation position identification system 1 according to the embodiment of the present invention can eliminate the deviation between the signal waveforms restored from the corrected data generated in the plurality of data collection devices 10. Accordingly, the signal generation position identification system 1 can improve the accuracy of the analysis of the signal waveform performed by the data analysis device 20.

Some or all of the data collection device 10 and the data analysis device 20 in the above-described embodiment may be realized by a computer. In this case, the data collection device 10 and the data analysis device 20 may be realized by recording a program for realizing a control function thereof on a computer-readable recording medium, loading the program recorded on the recording medium into a computer system, and executing the program. Here, it is assumed that the "computer system" is a computer system built in the data collection device 10 and the data analysis device 20, and includes an OS or hardware such as a peripheral device. Further, the "computer-readable recording medium" refers to a portable medium such as a flexible disk, a magneto-optical disc, a ROM, or a CD-ROM, or a storage device such as a semiconductor memory such as a flash memory and a hard disk built into in the computer system.

Further, the "computer-readable recording medium" may also include a recording medium that dynamically holds a program for a short period of time, such as a communication line in a case in which the program is transmitted over a network such as the Internet or a communication line such as a telephone line or a recording medium that holds a program for a certain period of time, such as a volatile memory inside a computer system serving as a server and a client in such a case. Further, the program may be a program for realizing some of the above-described functions or may be a program capable of realizing the above-described functions in a combination with a program previously stored in the computer system.

Further, some or both of the data collection device 10 and the data analysis device 20 in the above-described embodiment may be realized as an integrated circuit such as a large scale integration (LSI). Each of functional blocks of the data collection device 10 and the data analysis device 20 may be individually made as a processor, or some or all of the functional blocks may be integrated as a processor. Further, a scheme of making an integrated circuit is not limited to the LSI, and the integrated circuit may be realized by a dedicated circuit or a general-purpose processor. Further, when an integrated circuit technology that replaces an LSI appears due to advances in semiconductor technology, an integrated circuit based on this technology may be used.

Although the embodiments of the present invention have been described above with reference to the drawings, it is obvious that the above embodiments are merely examples of the present invention and the present invention is not limited to the above embodiments. Therefore, addition, omission, replacement, and other changes of components may be made without departing from the technical idea and gist of the present invention.

[Reference Signs List]
1 Signal generation position identification system
10 Data collection device
20 Data analysis device
101 Time signal generation unit
102 Signal reception unit
103 Sampling unit
104 Input buffer
105 Reference signal reception unit
106 Processing parameter generation unit
107 Processing parameter storage unit
108 Data processing unit
109 Output buffer
110 Data transmission unit
201 Reference signal generation unit
202 Reference signal transmission unit
203 Data reception unit
204 Data storage unit
205 Data analysis unit

The invention claimed is:

1. A data collection device comprising:
a memory, and
a processor connected to the memory, the processor configured to:
receive a reference signal indicating a first time, the first time being a time measured by an external device, and the reference signal being transmitted at first time intervals from the external device;
measure a time at second time intervals and generate a time signal indicating a second time, the second time being the measured time;
generate a parameter value on the basis of the first time indicated by the received reference signal and the second time based on the generated time signal at a point in time when the reference signal is received;
receive an analog signal indicating a signal waveform of an observed signal;
sample the received analog signal at the second time intervals to generate sampling data, and
perform interpolation processing on the generated sampling data on the basis of the parameter value.

2. The data collection device according to claim 1, wherein the processor is configured to perform linear interpolation processing on the generated sampling data.

3. The data collection device according to claim 1, wherein the processor is configured to generate the parameter value based on a deviation between the first time and the second time.

4. The data collection device according to claim 1, wherein the processor is configured to sample the received analog signal when the time signal is generated.

5. The data collection device according to claim 1, wherein the parameter value is a deviation between the first time and the second time, and
the processor is configured to generate data at a time obtained by adding the parameter value to the second time, the generation of the data being performed by the interpolation processing.

6. The data collection device according to claim 1, wherein the processor is configured to perform the interpolation processing when a data amount of the generated sampling data reaches a predetermined data amount.

7. The data collection device according to claim 1, wherein the processor is configured to generate the parameter value after performing a correction processing for considering a propagation time required for a propagation of the reference signal from the external device to the data collection device.

8. A signal generation position identification system including a plurality of data collection devices and a data analysis device,
wherein the data collection device includes
a first memory; and
a first processor connected to the first memory, the first processor being configured to:
receive a reference signal indicating a first time, the first time being a time measured by the data analysis device and the reference signal being transmitted at first time intervals from the data analysis device;
measure a time at second time intervals and generate a time signal indicating a second time, the second time being the measured time;
generate a parameter value on the basis of the first time indicated by the received reference signal and the second time based on the generated time signal at a point in time when the reference signal is received;
receive an analog signal indicating a signal waveform of an observed signal;
sample the received analog signal at the second time intervals to generate sampling data;

perform interpolation processing on the generated sampling data on the basis of the generated parameter value to generate interpolated data; and transmit the generated interpolated data to the data analysis device, and wherein the data analysis device includes a second memory: and a second processor connected to the second memory, the second processor being configured to:

generate the reference signal at the first time intervals;

transmit the generated reference signal to the data collection device;

receive the generated interpolated data transmitted from each of the plurality of data collection devices; and identify a position in which the signal is generated by analyzing a plurality of pieces of the received interpolated data.

9. The signal generation position identification system according to claim 8, wherein the second processor is configured to restore the signal waveform from each of the plurality of pieces of interpolated data and identifies the generation position on the basis of the deviation between the restored signal waveforms.

10. A data collection method comprising:

receiving a reference signal indicating a first time, the first time being a time measured by an external device, and the reference signal being transmitted at first time intervals from the external device;

measuring a time at second time intervals and generating a time signal indicating a second time, the second time being the measured time;

generating a parameter value on the basis of the first time indicated by the received reference signal and the second time based on the generated time signal at a point in time when the reference signal is received;

receiving an analog signal indicating a signal waveform of an observed signal;

sampling the received analog signal at the second time intervals to generate sampling data; and performing interpolation processing on the generated sampling data on the basis of the parameter value generated in the parameter generation step.

* * * * *